(12) United States Patent
Williams et al.

(10) Patent No.: US 6,401,168 B1
(45) Date of Patent: Jun. 4, 2002

(54) FIFO DISK DATA PATH MANAGER AND METHOD

(75) Inventors: John W. Williams; Michael James, both of Longmont, CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/225,124

(22) Filed: Jan. 4, 1999

(51) Int. Cl.[7] ............................................... G06F 12/00
(52) U.S. Cl. .................... 711/112; 711/105; 711/129; 714/773; 714/769
(58) Field of Search ............................. 711/112, 104, 711/105, 129; 714/773, 769

(56) References Cited

U.S. PATENT DOCUMENTS

| | | | | |
|---|---|---|---|---|
| 4,987,493 A | * | 1/1991 | Canfield et al. | 348/565 |
| 5,596,737 A | * | 1/1997 | Strang, Jr. | 711/213 |
| 5,600,815 A | * | 2/1997 | Lin et al. | 711/109 |

* cited by examiner

Primary Examiner—Matthew Kim
Assistant Examiner—Matthew D. Anderson
(74) Attorney, Agent, or Firm—W. Daniel Swayze, Jr.; W. James Brady; Frederick J. Telecky, Jr.

(57) ABSTRACT

A mass data storage device (10) and method for operating it are disclosed. The mass data storage device has a rotating disk memory (14) which has a number of sectors for containing data. A FIFO memory (30) has three memory sections (40–42), each for containing an entire sector of data associated with respective sectors of the rotating disk memory. An ECC unit (34) has random access to any data contained in the FIFO memory (30). The ECC unit (34) is operated to perform error correction on data while the data is contained in the FIFO memory (34). A FIFO memory controller (32) controls locations at which data is written into and read from the FIFO memory (30), and locations at which data correction is performed by the ECC unit (34), so that as data is written into a first portion of the memory containing a sector currently being written, the ECC unit concurrently accesses a second portion of the memory containing a sector previously written to correct data therein, and data that has already been corrected by the ECC unit in a third portion of the memory is concurrently being read from the memory.

16 Claims, 3 Drawing Sheets

FIFO DISK DATA PATH MANAGER AND METHOD

BACKGROUND OF THE INVENTION

1. Field of the Invention

This invention relates to improvements in data paths used in mass storage devices, or the like, and methods for implementing and operating same, and additionally to improvements in the construction and operation of a data FIFO between buffer manager and disk formatter circuitry of a controller circuit, or the like.

2. Relevant Background

In the operation of a controller circuit of a typical mass storage device, a buffer manager is provided to manage the flow of data between a host computer and a mass storage device, such as a hard rotating disk, or the like. As a part of its function, the buffer manager arbitrates between various competing demands for data bandwidth.

The buffer manager, which is typically controlled by a microprocessor provided in association with the controller circuit, is typically arranged to receive data from a host interface circuit, which, in turn, receives data from the host computer via a speed correcting FIFO memory. The buffer manager typically routes the data from the FIFO memory into the buffer memory. The buffer memories used in the past have typically been SRAM memory devices, but, recently DRAM memory devices have been used. The buffer memory may be separately provided, or may be provided as a part of the controller circuit of the mass storage device. The buffer manager, at an appropriate time, retrieves the data from the DRAM and writes it to the disk memory through a second FIFO memory.

The FIFO memories that are provided are generally needed to compensate for the differences in speed of the various circuitry through which the data must pass between the host computer and the mass storage device. For example, when the host computer writes data to the mass storage device, due to the amount of processing that must be performed on the data before it can be properly written to disk, or even to the data buffer in the controller circuit, the transfer of the data to or from the host computer would need to be moderated. The alternative is to slow the rate at which data is transferred from the host computer, which is undesirable. Consequently, two FIFO memories are provided, one between the host interface and the buffer manager and the other between the buffer manager and the disk formatter circuit.

In the past, the FIFO memories have been a fairly limited size, for example, of size sufficient to contain on the order of 32 or 64 words. The size of the FIFO memories is primarily determined by the rate at which data is transferred between the host computer and the mass storage device and the amount of delay that is required during the transfer.

An error correction code (ECC) device is also provided as a part of the controller circuit. The ECC device is operated in conjunction with the buffer manager to correct the data as it is being read from the mass storage device in a well known manner. (Typically the ECC device is not active during write operations to the disk, since no corrections via the ECC occur during disk writes.) However, in its operation, the ECC typically accesses the data through and under the control of the buffer manager.

Since one of the functions of the buffer manager is to arbitrate among the various devices contending for access to the data, the control of the data sought by the ECC device requires a significant amount of data bandwidth that otherwise could be available to the data in the data path between the computer and mass storage device. During the operation of the ECC device, the data on which the ECC device operates is held until the completion of the ECC functions on that data. At the conclusion of the error correction operations, the ECC circuit issues an "ECC done" signal to the buffer manager to release the data. Thus, it can be seen that if a large number of corrections are made by the ECC circuit to the data, which may be, for example, up to 30 random bytes per sector, the data bandwidth of the buffer manager may be significantly impacted. This ultimately results in slower data transfers between the host computer and the mass storage device.

What Is needed is an arrangement for use in a controller circuit of a mass storage device that does not have the data bottleneck caused by the operation of the buffer manager.

SUMMARY OF THE INVENTION

In light of the above, therefore, it is an object of the invention to provide an improved data path for mass storage devices, or the like.

It is another object of the invention to provide an improved architecture for mass data storage devices in which buffer bandwidth is not affected by ECC accesses, and in which ECC accesses can be completed more rapidly than most prior art devices.

It is another object of the invention to provide an improved architecture of the type described having an extended FIFO depth to which the ECC has access, and in which the ECC bandwidth is managed by circuitry associated with the FIFO before it goes to the buffer.

It is another object of the invention to provide an improved architecture of the type described in which the number of cycles required to complete an ECC correction are reduced from typical ECC cycles required in prior art devices.

It is an object of the invention to provide a method and apparatus to increase the buffer bandwidth of a disk controller, or the like.

It is another object of the invention to provide a capability for an ECC device to access data to be corrected faster than heretofore.

It is another object of the invention to provide an improved data path that enables DRAMs to be used, if desired, for controller circuit buffer memory.

It is yet another object of the invention to provide an improved data path that enables correct-on-the-fly ECC correction capabilities.

These and other objects, features and advantages of the invention will be apparent to those skilled in the art from the following detailed description of the invention, when read in conjunction with the accompanying drawings and appended claims.

In accordance with a broad aspect of the invention, a data storage device is provided. The data storage device has a data storage unit and a FIFO memory. The FIFO memory has at least sufficient memory capacity to contain three sectors of data associated with the data storage unit. An ECC unit has random access to any sector contained in the FIFO memory so that error correction and control is performed on data in the FIFO memory. A FIFO memory controller controls locations at which data is written into and read from the FIFO memory. With this arrangement, the FIFO memory may be a DRAM, a single-port RAM, an SRAM, a dual-port RAM, a two-port RAM, or other suitable memory type. The FIFO memory controller controls the locations at which data is written into and read from the FIFO memory so that as data is written into a first portion of the memory containing a sector currently being written, the ECC unit concurrently accesses a second portion of the memory containing a sector previously written to correct data therein, and data that has already been corrected by the ECC unit in a third portion of the memory is concurrently being read from the FIFO memory.

According to another broad aspect of the invention, a mass data storage device is provided that has a rotating disk memory having a number of sectors or containing data. A FIFO memory has three memory sections, each for containing an entire sector of data associated with respective sectors of the rotating disk memory. An ECC unit has random access to any data contained in the FIFO memory. The ECC unit Is operated to perform error correction on data while the data is contained in the FIFO memory. A FIFO memory controller controls locations at which data is written into and read from the FIFO memory, and locations at which data correction is performed by the ECC unit, so that as data is written into a first portion of the memory containing a sector currently being written, the ECC unit concurrently accesses a second portion of the memory containing a sector previously written to correct data therein, and data that has already been corrected by the ECC unit in a third portion of the memory is concurrently being read from the FIFO memory.

According to yet another broad aspect of the invention, a FIFO memory arrangement is presented for use in a data path of a mass data storage device. The FIFO memory arrangement has three memory sections, each for containing an entire sector of data associated with respective sectors of an associated rotating disk memory. An ECC unit with random access to any data contained in the FIFO memory, wherein error correction and control is performed on data while the data is contained in the FIFO memory. A FIFO memory controller controls locations at which data is written into and read from the FIFO memory, and locations at which data correction is performed by the ECC unit. The FIFO memory controller controls the locations at which data is written into and read from the FIFO memory so that as data is written into a first portion of the memory containing a sector currently being written, the ECC unit concurrently accesses a second portion of the memory containing a sector previously written to correct data therein, and data that has already been corrected by the ECC unit in a third portion of the memory is concurrently being read from the FIFO memory.

According to yet another broad aspect of the invention, a method for operating a data path of a mass data storage device is presented. The method Includes providing a FIFO memory having three memory sections. Each of the memory sections is arranged to contain an entire sector of data associated with respective sectors of an associated rotating disk memory. An ECC unit is operated to have random access to any data contained in the FIFO memory so that error correction and control is performed on data while the data is contained in the FIFO memory.

BRIEF DESCRIPTION OF THE DRAWINGS

The invention is illustrated in the accompanying drawings, in which.

In the various Figures of the drawing, like reference numerals are used to denote like or similar parts.

DETAILED DESCRIPTION OF THE PREFERRED EMBODIMENTS

Figure 1:
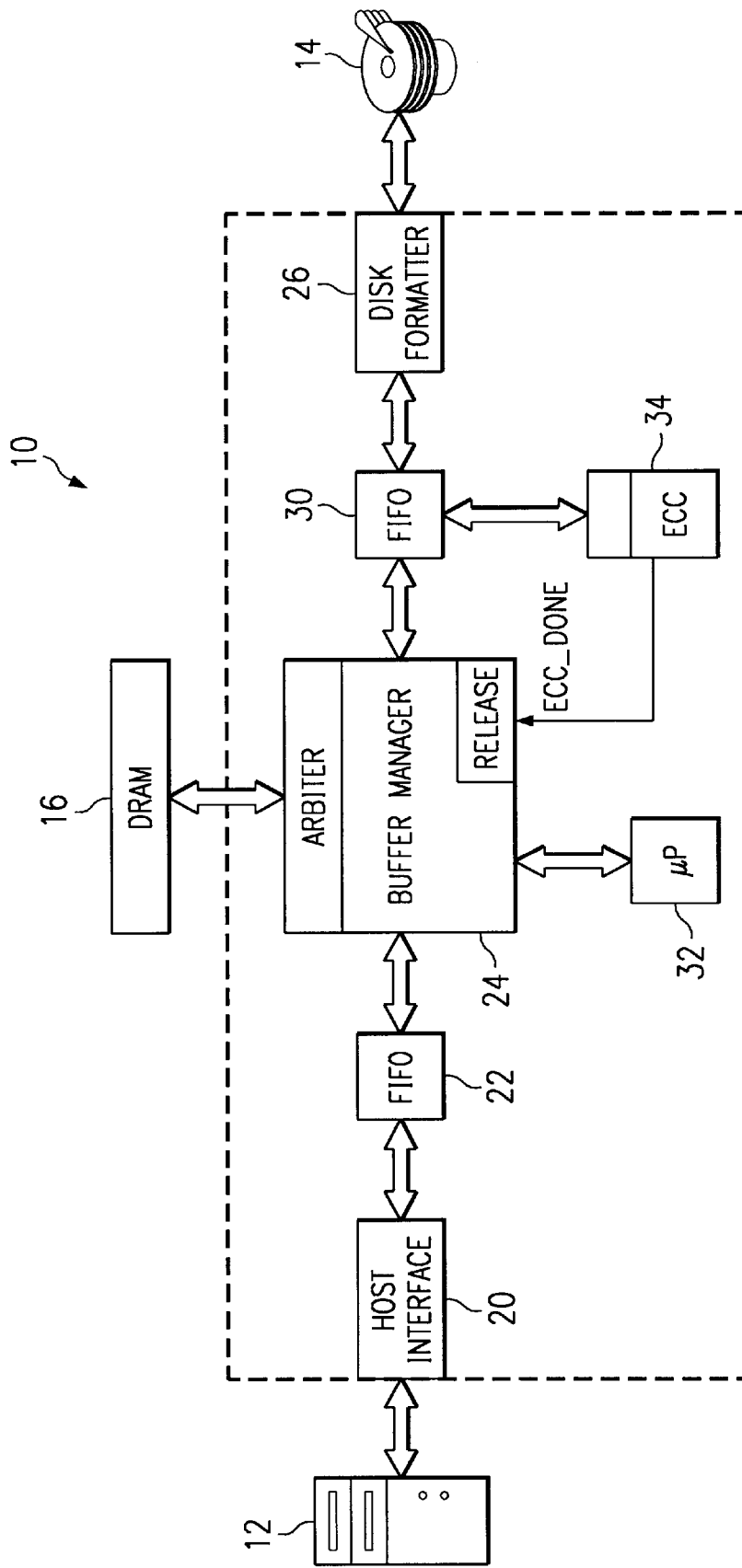
FIG. 1 is a block diagram of a portion of a controller circuit used in association with a mass data storage device, or the like, in accordance with a preferred embodiment of the invention.

A block diagram of a portion of a controller circuit 10 used in association with a mass storage device, or the like, in accordance with a preferred embodiment of the invention, is shown in FIG. 1. The mass storage device may be, for example, a hard disk drive of the type used in computer applications, or the like, in which a rotating magnetic disk contains data written to or read from it. Typically, hard disk drives of the type of interest herein are divided into sectors along boundaries extending radially outward from the center of the rotating magnetic media. Each sector contains a pre-determined quantity of data, for example, 512 bytes of data. The controller circuit 10 is connected between a host computer 12 and the mass storage device 14 to control the data flow there between. In addition, the controller circuit 10 is connected to a buffer memory 16.

The data path between the host computer 12 and hard disk drive 14 includes a host interface 20, which interfaces data from the data channel to and from the host computer 12. A first FIFO 22 is provided on the host side of the controller circuit to provide data timing between the host interface 20 and a buffer manager 24. The FIFO 22 may be, for example, 32 words wide. On the disk drive side of the 14, a disk formatter 26 is provided. The disk formatter is connected to the buffer manager 24 through a FIFO 30, constructed in accordance with the invention. The FIFO 30 is preferably is a single port RAM or a dual-port RAM memory, although those skilled in the art will recognize that SRAM or other memory types can be equally advantageously employed. The buffer manager 24 is controlled by a microprocessor 32 or an appropriate DSP device.

An error correction code (ECC) circuit 34 is provided to perform known error correction and control functions on the data read from the disk 26. According to one aspect of the invention, in contrast to the prior art in which the ECC circuit interfaces to the buffer manager, the ECC circuit 34 interfaces to a modified FIFO 30, details of which are described in connection with FIG. 2. The ECC 34 can be constructed in the same manner as prior ECC circuits; however, due to the construction of the FIFO 30, the ECC 34 can be modified to enable faster read-modify-write cycles in the correction of the data contained in the FIFO 30.

Figure 2:
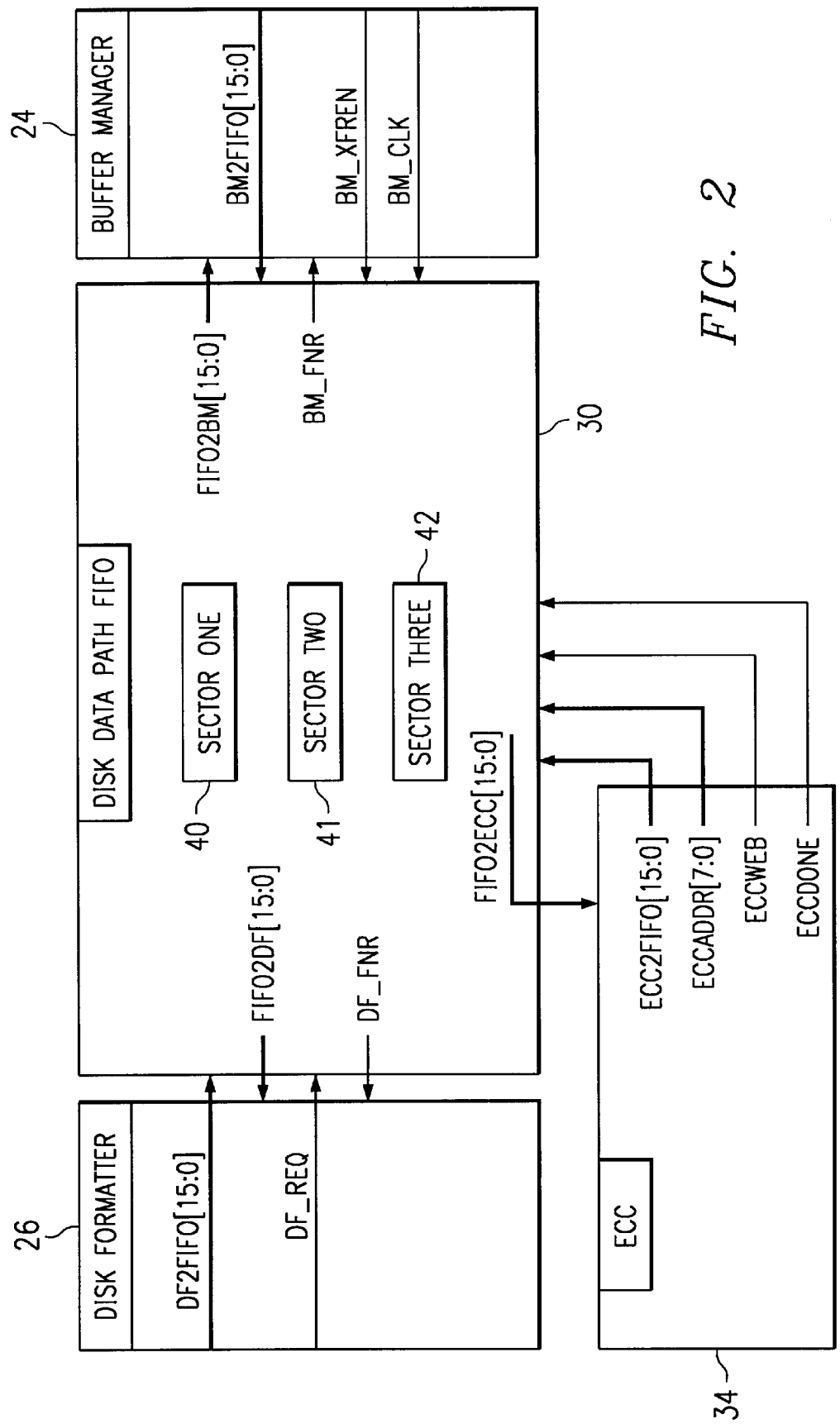
FIG. 2 is a block diagram illustrating details of an improved FIFO, for use in a controller circuit constructed in accordance with a preferred embodiment of the invention.

More particularly, details of the FIFO 30, in accordance with the preferred embodiment of the invention, are shown in FIG. 2. As indicated above, the FIFO 30 is located between the disk formatter 26 and the buffer manager 24. The FIFO 30 includes three FIFO sections 40, 41, and 42. Each of the sectors 40–42 is sized to be enabled to contain data from an entire sector of the mass storage device. Data is written into and read from the FIFO 30 from locations indicated by a number of pointers, as described below.

Thus, one of the main architectural changes from previous disk data path implementations is the increase of the normal disk FIFO depth from 32 words to three or more sectors. By extending the FIFO depth and giving addressable access to the ECC to sectors of data contained in the FIFO 30, all ECC bandwidth can be managed in the FIFO before it goes to the buffer manager 24, and ultimately the buffer memory 16. Thus, the bandwidth of the buffer is no longer affected by the ECC accesses, and the ECC accesses can complete more quickly.

Figure 3:
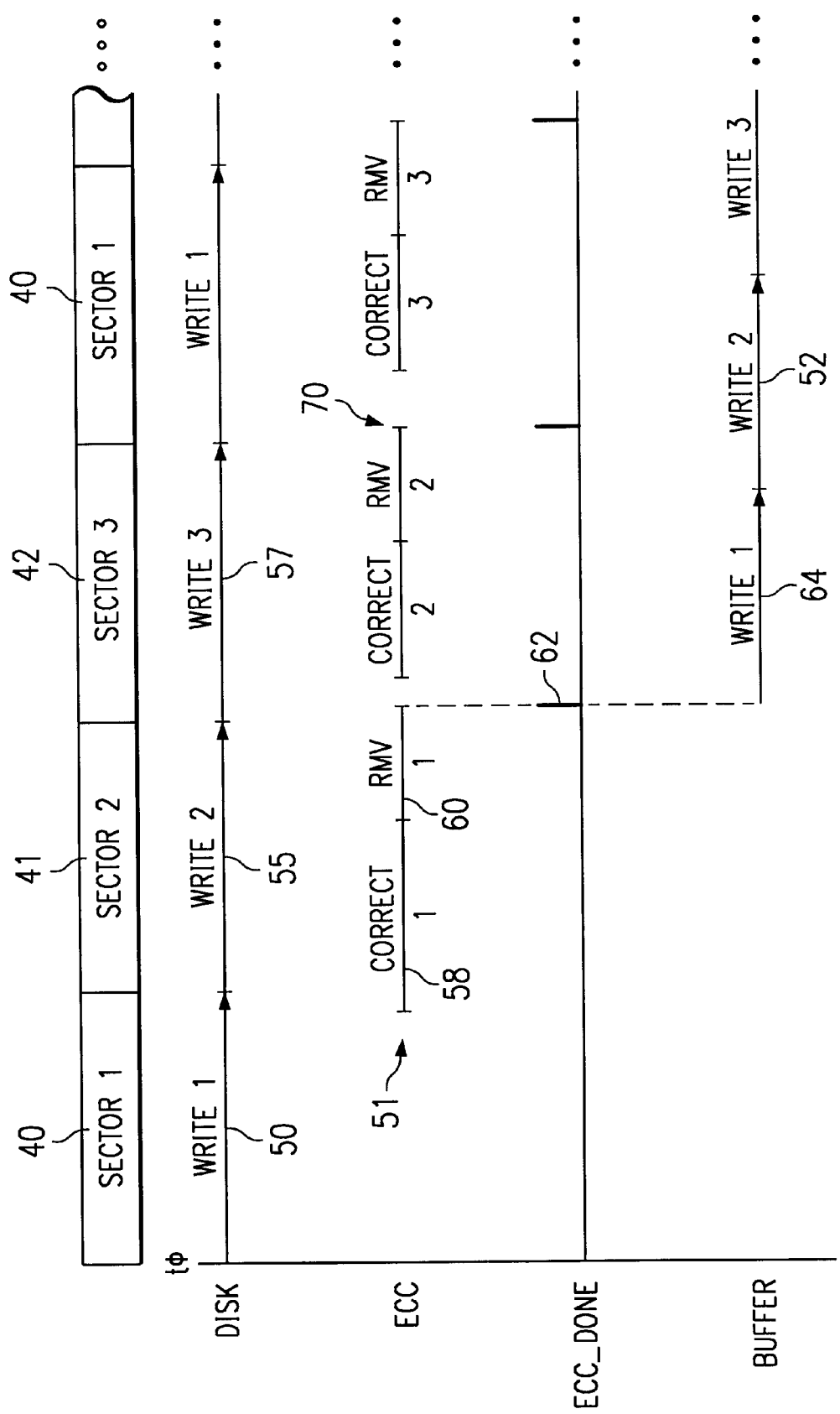
FIG. 3 is a time sequence diagram showing the timing of disk, ECC, and buffer operations of a single port RAM in a FIFO device containing three disk sectors, in accordance with a preferred embodiment of the invention.

In operation of the FIFO 30, with reference now additionally to FIG. 3, assuming that operation in which it is desired to read data from a first disk sector, at an initial time, t0, the data is received from the disk and written to the "sector 1" 40 of the FIFO memory 30, shown by the line segment 50. As soon as the data write to sector 1 40 of the FIFO memory 30 is completed, the next data sector of the disk is read and written to the second sector, "sector 2" 41, of the FIFO 30, shown by the line segment 55. Then, a third sector of data is read from the disk and written to the third sector, "sector 3" 42 of the FIFO 30, as shown by the line segment 57. The process is then repeated until all of the requested data has been read from the disk.

During the time 55 that the second sector of data is being written to "sector 2" of the FIFO 30, the ECC circuit 34 is operated to correct the data in "sector 1" 40 of the FIFO 30, shown by the line segment 51. This occurs concurrently with the write operation 55 of the second sector of data to "sector 2" 41, operationally described above. After the ECC 34 has corrected the data in "sector 1" during the "sector 2" write, during time segment 58, the corrected data is written back to "sector 1", for example, using a well-known read-modify-write process, during time segment 60.

It should be noted that the error correction process may be completed prior to the completion of the second sector write cycle 55, as shown. Nevertheless, the ECC circuitry 34 may, on completion of the correction cycle of the FIFO "sector 1", issue a "ECC done" signal 62 indicating that the data that is contained in "sector 1" 40 of the FIFO 30 is available to be written out from the FIFO 30. This is indicated by the time segment 64 in FIG. 3, in which the FIFO write from "sector 1" 40 of the FIFO 30 commences immediately upon the completion of the ECC process to corrected data in "sector 1" upon the issuance of the ECC done signal 62.

With reference again to the time sequence diagram of FIG. 3, the ECC circuit, after the completion of the write process 55 in which data is written to "sector 2" 41, the ECC correction process may be performed on data in "sector 2" 41 concurrently with the writing of data to the third sector, "sector 3" 42, denoted by time segment 57. Again, upon the completion of the error correction process of the second sector 70 during the data writing operation of sector three 57, the data can be written to the data buffer, shown by segment 52. The overall process can then be repeated with data again being written into the first FIFO sector, "sector 1" 40.

It is noted that preferably each sector in the FIFO 30 can be accessed by only one port at a time. This allows for a single-port RAM design that saves silicon. To accomplish the operation described above, the FIFO 30 is provided with three pointers: the disk port pointer (DPP), the buffer port pointer (BPP), and the ECC sector pointer (ESP). Moreover, the FIFO 30 is at least three sectors deep, arranged one after the other with circular wrapping pointers so that sectors will be accessed first, second, . . . , last, then first again, as described.

During disk writes, there are only two active ports, the disk port and the buffer port. The ECC is not active during a disk write, since no corrections via the ECC occur during disk writes. Initially, a signal, DF_FNR (Disk Formatter—FIFO Not Ready), is asserted to the disk formatter 26 because there is no data available to the disk. A signal, BM_FNR (Buffer Manager—FIFO Not Ready), to the buffer manager 24 is deasserted because there is space available to the buffer. Disk formatter and buffer manager pointers, DPP and BPP, both point to the first word in the first sector 40, and the buffer starts writing data to the first sector 40 of the FIFO 30. As this occurs, the buffer pointer, BPP, increments within the first sector 40 until an entire data sector is written.

During this time, the signal, DF_FNR, to the disk formatter 26 is still being asserted. This holds off the disk from proceeding until the first sector 40 becomes "available", by the buffer manager 24 completing the transfer of the data to the first sector 40. At this point the buffer pointer, BPP, points to the first word of the second sector 41. When this occurs, disk formatter signal, DF_FNR, deasserts, so that the disk 14 can start taking data from the first sector 40 of the FIFO.

The buffer manager then continues writing data to the next, or second, sector 41 in the FIFO 30, while the disk 14 is receiving data from the first sector 40 of the FIFO. The buffer manager will continue writing sectors into the FIFO 30, incrementing the buffer pointer, BPP, until there is no more space available in the FIFO 30, or until the buffer manager signal, BM_FNR, is reasserted. The buffer manager signal, BM_FNR, asserts when the buffer pointer, BPP, increments to the first byte of the sector to which the disk formatter pointer, DPP, points.

The disk will read data out of the FIFO as long as there is data "available" or until the disk formatter signal, DF_FNR, asserts. The disk formatter signal, DF_FNR, asserts when the disk formatter pointer, DPP, increments to point to the first word in the sector to which the buffer pointer, BPP, points. Through firmware programming, both the disk and buffer know how many sectors are to be transferred. So, at the end of the transfer, the buffer will stop supplying data to the FIFO even though the buffer manager signal, BM_FNR, is deasserted. Then, the disk will transfer the rest of the sectors left in the FIFO 30 until the disk formatter pointer, DPP, and buffer pointer, BPP, are both pointing to the first word of the same sector, which is again the initial state of the FIFO 30.

On the other hand, during disk reads, all three ports are active. Initially, the disk formatter signal, DF_FNR, is deasserted because there is space available in the FIFO for the disk. The buffer manager signal, BM_FNR, is asserted because there is no data available to the buffer. The disk formatter pointer, DPP, the buffer pointer, BPP, and the ECC sector pointer, ESP, are all pointing to the first sector (and first word where applicable). The disk port is the only port that is active. The disk starts writing data into the FIFO 30. As this occurs, the disk formatter pointer, DPP, increments in the same sector until a whole data sector is written. Once this occurs, the disk formatter pointer, DPP, points to the first word in the second sector. At this time, the ECC port becomes active, and buffer manager signal, BM_FNR, remains asserted (buffer port is still inactive). It should be noted that it is inherent to controller design that the ECC will not attempt to access a sector until the disk has processed the whole sector. While the ECC port is active, the specific data word being operated on is determined by the ECC sector pointer, ESP, which is pointing to and the word ECCADDR is pointing to. Data will then be read from the sector in FIFO 30 that contains the word ECCADDR to which the ECC is pointing. The word is presented on the signal path FIFO2ECC when ECCWEB is deasserted and written to the FIFO RAM from ECC2FIFO when ECCWEB is asserted, thus allowing the ECC to perform standard Read-Modify-Write operations.

Once the ECC has completed making its corrections to the current sector, ECCDONE is pulsed, causing the ECC sector pointer, ESP, to be incremented, and the sector to be "released" to the buffer, thus causing the buffer manager signal, BM_FNR, to deassert. The buffer port can then read the sector that the ECC circuit has "released". The buffer will read the whole first sector, incrementing the buffer pointer, BPP, as it does so. If another ECCDONE pulse does not occur before the buffer pointer, BPP, reaches the first word of the next sector, the buffer manager signal, BM_FNR, asserts, holding off the buffer from advancing until the ECC circuit has "released" the sector.

Thus, as the ECC circuit 34 is making its correction to the first sector 40, the disk is writing to the second 41 (and possibly third 42) sector. When the ECC sector pointer, ESP, is incremented, the ECC circuit will make corrections to the next sector (always following the disk by one or two sectors—depending on the implementation) if there are any to be made. Once the ECC circuit is done with a sector, the sector gets released by ECCDONE signal, and the buffer can transfer the sector. This all happens in a circular fashion. If either the buffer or ECC circuit is slow, the disk formatter signal, DF_FNR, can assert if the disk formatter pointer, DPP, increments such that it points at the first word of the sector that the buffer pointer, BPP, points to. Once the buffer pointer, BPP, increments Lo the next sector, the disk formatter signal, DF_FNR, deasserts, allowing the disk to continue filling the FIFO.

It should be noted that because the bandwidth demands on the buffer manager 24 have been significantly reduced due to the ability of the ECC to directly access data in the appropriate data sector of the FIFO 30, circuit modifications can be made to the ECC circuit 34 to increase its effective error correcting speed. It will be appreciated that overall, the effective speed of the data path has been significantly increased.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A data storage device, comprising:
   a data storage unit;
   a FIFO memory, having at least sufficient memory capacity to contain three sectors of data associated with said data storage unit;
   an ECC unit having random access to any sector contained in said FIFO memory, wherein error correction and control is performed on data in said FIFO memory; and
   a FIFO memory controller to control locations at which data is written into and read from said FIFO memory, wherein said FIFO memory controller controls said locations at which data is written into and read from said FIFO memory, wherein as data is written into a first portion of said memory containing a sector currently being written, said ECC unit concurrently accesses a second portion of said memory containing a sector previously written to correct data therein, and data that has already been corrected by said ECC unit in a third portion of said memory is concurrently being read from said memory.

2. The data storage device of claim 1 wherein said FIFO memory is a DRAM.

3. The data storage device of claim 1 wherein said FIFO memory is an SRAM.

4. The data storage device of claim 1 wherein said FIFO memory is a single-port RAM.

5. The data storage device of claim 1 wherein said data storage unit is a hard rotating magnetic disk.

6. A mass data storage device, comprising:
   a rotating disk memory having a number of sectors for containing data;
   a FIFO memory, having three memory sections, each for containing an entire sector of data associated with respective sectors of said rotating disk memory;
   an ECC unit with random access to any data contained in said FIFO memory, wherein error correction and control is performed on data while said data is contained in said FIFO memory; and
   a FIFO memory controller to control locations at which data is written into and read from said FIFO memory, and locations at which data correction is performed by said ECC unit, wherein said FIFO memory controller controls said locations at which data is written into and read from said FIFO memory, wherein as data is written into a first portion of said memory containing a sector currently being written, said ECC unit concurrently accesses a second portion of said memory containing a sector previously written to correct data therein, and data that has already been corrected by said ECC unit in a third portion of said memory is concurrently being read from said memory.

7. The mass data storage device of claim 6 wherein said FIFO memory is a DRAM.

8. The mass data storage device of claim 6 wherein said FIFO memory is a single-port RAM.

9. The mass data storage device of claim 6 wherein said FIFO memory is an SRAM.

10. A FIFO memory arrangement for use in a controller circuit of a mass data storage device, comprising:
    three memory sections, each for containing an entire sector of data associated with respective sectors of an associated rotating disk memory;
    an ECC unit with random access to any data contained in said FIFO memory, wherein error correction and control is performed on data while said data is contained in said FIFO memory; and
    a FIFO memory controller to control locations at which data is written into and read from said FIFO memory, and locations at which data correction is performed by said ECC unit, wherein said FIFO memory controller controls said locations at which data Is written into and read from said FIFO memory, wherein as data is written into a first portion of said memory containing a sector currently being written, said ECC unit concurrently accesses a second portion of said memory containing a sector previously written to correct data therein, and data that has already been corrected by said ECC unit in a third portion of said memory is concurrently being read from said memory.

11. The FIFO memory arrangement of claim 10 wherein said FIFO memory is a DRAM.

12. The FIFO memory arrangement of claim 10 wherein said FIFO memory is a single-port RAM.

13. The FIFO memory arrangement of claim 10 wherein said data storage unit is a hard rotating magnetic disk.

14. A method for operating a controller circuit of a mass data storage device, comprising:

provic a FIFO memory having three memory sections, each for containing an entire sector of data associated with respective sectors of an associated rotating disk memory;

operating an ECC unit to have random access to any data contained in said FIFO memory, wherein error correction and control is performed on data while said data is contained in said FIFO memory, wherein said operating an ECC unit to have random access to any data contained in said FIFO memory comprises writing data into a first portion of said memory containing a sector currently being written, operating said ECC unit to concurrently access a second portion of said memory containing a sector previously written to correct data therein, concurrently reading data that has already been corrected by said ECC unit from a third portion of said memory.

15. The method claim 14 wherein said providing a FIFO memory comprises providing a DRAM having three memory sections, each for containing an entire sector of data associated with respective sectors of an associated rotating disk memory.

16. The method claim 14 wherein said providing a FIFO memory comprises providing a single-port RAM having three memory sections, each for containing an entire sector of data associated with respective sectors of an associated rotating disk memory.

* * * * *